United States Patent
Van Zutphent et al.

(10) Patent No.: US 11,326,808 B2
(45) Date of Patent: May 10, 2022

(54) PREMIX GAS BURNER

(71) Applicant: BEKAERT COMBUSTION TECHNOLOGY B.V., Assen (NL)

(72) Inventors: René Van Zutphent, De Wijk (NL); Geert Folkers, Bruchterveld (NL); Daniel Holtrop, Assen (NL); Roelof Boer, Anloo (NL); Derk Oostra, Anderen (NL); Johan Christiaan Holsappel, Hoogezand (NL)

(73) Assignee: BEKAERT COMBUSTION TECHNOLOGY B.V., Assen (NL)

( * ) Notice: Subject to any disclaimer, the term of this patent is extended or adjusted under 35 U.S.C. 154(b) by 0 days.

(21) Appl. No.: 16/630,153

(22) PCT Filed: Jul. 4, 2018

(86) PCT No.: PCT/EP2018/068031
§ 371 (c)(1),
(2) Date: Jan. 10, 2020

(87) PCT Pub. No.: WO2019/011735
PCT Pub. Date: Jan. 17, 2019

(65) Prior Publication Data
US 2020/0182511 A1   Jun. 11, 2020

(30) Foreign Application Priority Data
Jul. 13, 2017 (EP) .................................... 17181106

(51) Int. Cl.
*F23D 14/02* (2006.01)
*F23D 14/14* (2006.01)
*F24H 8/00* (2022.01)

(52) U.S. Cl.
CPC ............... *F24H 8/00* (2013.01); *F23D 14/02* (2013.01); *F23D 14/14* (2013.01); *F23D 14/145* (2013.01); *F23D 2213/00* (2013.01)

(58) Field of Classification Search
CPC ........... F23D 14/145; F23D 2203/1017; F23D 14/02; F23D 2203/102; F23D 2203/101;
(Continued)

(56) References Cited

U.S. PATENT DOCUMENTS 2,081,560 A * 5/1937 Rogers .................... F24C 1/06
126/36
2,336,816 A * 12/1943 Thompson .............. F24C 3/042
431/329
(Continued)

FOREIGN PATENT DOCUMENTS

| CN | 2637912 | 9/2004 |
|----|---------|--------|
| EP | 2 746 658 | 6/2014 |
| EP | 2 789 911 | 10/2014 |

OTHER PUBLICATIONS

International Search Report dated Sep. 14, 2019 in International (PCT) Application No. PCT/EP2018/068031.

*Primary Examiner* — Jorge A Pereiro
(74) *Attorney, Agent, or Firm* — Wenderoth, Lind & Ponack, L.L.P.

(57) ABSTRACT

A premix gas burner (100) comprises a metal mounting plate (102) for mounting the premix gas burner in a heating appliance; a metal plate structure (104) and a burner deck (106). The burner deck comprises a woven wire mesh on the outer surface of which premix gas is combusted after the premix gas has flown through the woven wire mesh. The woven wire mesh comprises a circumferential edge (108). The circumferential edge comprises a plurality of tabs (110). The mounting plate comprises a central opening. The burner deck is inserted through the central opening. The metal
(Continued)

mounting plate or the metal plate structure comprises at least one ridge (112). The at least one ridge comprises at least one notch (114). Each of the tabs is positioned in a notch. The metal mounting plate and the metal plate structure are in contact with each other at the top of the ridge, such that the open side of the at least one notch is covered; and such that the tabs are held in between the metal mounting plate and the metal plate structure with play being present of the tabs relative to the metal mounting plate and relative to the metal plate structure.

15 Claims, 2 Drawing Sheets

(58) Field of Classification Search
CPC .............. F23D 2203/103; F23D 14/14; F23D 2211/00; F23D 2203/105
See application file for complete search history.

(56) References Cited

U.S. PATENT DOCUMENTS

| | | | | |
|---|---|---|---|---|
| 3,233,653 A * | 2/1966 | Nakamura | ............ | F23D 14/145 |
| | | | | 431/329 |
| 3,360,028 A * | 12/1967 | Saponara | .............. | F23D 14/145 |
| | | | | 431/329 |
| 3,401,000 A * | 9/1968 | Spaonara | ................ | F23C 99/00 |
| | | | | 431/329 |
| 3,814,573 A * | 6/1974 | Karlovetz | ................. | F24C 3/14 |
| | | | | 431/329 |
| 4,039,275 A * | 8/1977 | McGettrick | ........... | F23D 14/145 |
| | | | | 431/329 |
| 5,474,443 A | 12/1995 | Viessmann et al. | | |
| 5,520,536 A * | 5/1996 | Rodgers | .................. | F23D 14/02 |
| | | | | 126/116 R |
| 5,820,247 A * | 10/1998 | Schuler | ..................... | F21V 3/02 |
| | | | | 362/96 |
| 6,007,329 A * | 12/1999 | Meyer | ..................... | F23D 14/14 |
| | | | | 431/326 |
| 6,139,312 A * | 10/2000 | Lasagni | ................. | F23D 14/105 |
| | | | | 126/92 AC |
| 6,662,758 B1 * | 12/2003 | Shin | .......................... | F24H 8/00 |
| | | | | 122/18.1 |
| 2005/0172915 A1 | 8/2005 | O'Donnell et al. | | |
| 2007/0298361 A1 * | 12/2007 | Fogliani | ................ | F23D 14/583 |
| | | | | 431/354 |
| 2015/0369495 A1 * | 12/2015 | Maricic | ............... | F24D 19/1084 |
| | | | | 126/116 A |
| 2016/0123580 A1 * | 5/2016 | Van Den Berg | ...... | F23D 14/145 |
| | | | | 122/17.1 |
| 2016/0238243 A1 * | 8/2016 | Gilioli | ..................... | F23D 14/26 |

* cited by examiner

PREMIX GAS BURNER

TECHNICAL FIELD

The invention relates to the field of premix gas burners, more particularly to surface stabilized premix gas burners comprising a woven wire mesh as burner deck.

BACKGROUND ART

Surface stabilized premix gas burner having a woven wire mesh burner deck are known.

U.S. Pat. No. 5,474,443A discloses a premix gas burner with a hemispherical burner deck out of a woven wire mesh.

US2005/172915 shows a premix gas burner having a woven wire mesh combustion surface comprising rigidizing ribs.

DISCLOSURE OF INVENTION

The first aspect of the invention is a premix gas burner comprising a metal mounting plate for mounting the premix gas burner in a heating appliance; a metal plate structure and a burner deck. The burner deck comprises—and preferably consists out of—a woven wire mesh on the outer surface of which premix gas is combusted after the premix gas has flown through the woven wire mesh. The woven wire mesh comprises a circumferential edge. The circumferential edge comprises a plurality of tabs. The mounting plate comprises a central opening. The burner deck is inserted through the central opening. The metal mounting plate or the metal plate structure comprises at least one ridge. The at least one ridge comprises at least one notch. Each of the tabs is positioned in a notch. The metal mounting plate and the metal plate structure are in contact with each other at the top of the ridge, such that the open side of the at least one notch is covered; and such that the tabs are held in between the metal mounting plate and the metal plate structure with play being present of the tabs relative to the metal mounting plate and relative to the metal plate structure.

The woven wire mesh burner deck of surface stabilized premix gas burners gets hot when the burner is in use. The woven wire mesh burner deck needs to be able to cope with the stresses induced by the thermal expansion associated with the high temperature when the burner is in use and by the shrinkage when the burner is not in use. If this is not the case, early mechanical failure of the burner deck will occur. Thanks to the provision of play of the at least one tab relative to the metal mounting plate and relative to the metal plate structure, a certain amount of movement of the woven wire mesh relative to the mounting metal plate and to the metal plate structure is possible when the woven wire mesh expands when warming up or shrinks when cooling down. Therefore surprisingly, the premix gas burner of the invention has shown to be very well suited to withstand thermal expansion and shrinkage, resulting in a long lifetime of the premix gas burner.

Preferably, the tabs comprise or consist out of woven wire mesh. More preferably, the tabs are an integral part of the woven wire mesh.

The metal plate structure can be e.g. be welded to the metal mounting plate.

Preferably, in operation of the burner, premix gas is fed through the central opening to the burner deck.

Preferred tabs have a substantially rectangular shape. Preferred tabs have a width between 4 and 32 mm; more preferred between 6 and 20 mm.

Preferred tabs have a height between 1 to 12 mm; more preferably between 3 and 6 mm.

Preferred tabs have a largest width between 4 and 32 mm; more preferably less than 20 mm; more preferably between 6 and 20 mm. Preferred tabs have a largest height between 3 and 6 mm.

Preferably, the woven wire mesh has a thickness between 0.6 and 1.3 mm. As an example, a woven wire mesh of 0.9 mm thickness can be advantageously used in the invention.

In a preferred embodiment, the woven wire mesh does not comprise ribs nor embossments.

In a preferred embodiment, the woven wire mesh comprises ribs and/or embossments.

Preferably, the play being present of the tabs relative to the metal mounting plate and relative to the metal plate structure is at least 0.4 mm. More preferably, the play is between 0.4 and 1 mm; even more preferably, the play is between 0.5 to 0.8 mm. With the play is meant the difference between the metal mounting plate and the metal plate structure from which the thickness of the woven wire mesh is subtracted.

In a preferred premix gas burner, the at least one ridge is provided in the metal mounting plate. The at least one ridge is provided at least partly around the central opening. The at least one ridge extends towards a first side relative to the plane of the metal mounting plate. The burner deck extends towards the other side of the plane of the metal mounting plate compared to the first side. The metal plate structure covers the open side of the at least one notch such that the tabs are held in between the metal mounting plate and the metal plate structure with play being present of the tabs relative to the metal mounting plate and relative to the metal plate structure.

In a preferred premix gas burner, the at least one ridge is provided in the metal plate structure. The at least one ridge extends towards a first side relative to the plane of the metal plate structure where the at least one ridge is provided. The burner deck extends through the central opening to the first side relative to the plane of the metal plate structure where the at least one ridge is provided. The metal mounting plate covers the open side of the at least one notch such that the tabs are held in between the metal mounting plate and the metal plate structure with play being present of the tabs relative to the metal mounting plate and relative to the metal plate structure.

Preferably, the tabs are parallel with the plane of the metal mounting plate.

Preferably, the ridge surrounds the complete burner deck.

In a preferred embodiment, the burner deck is provided in a convex shape. It is meant that when the burner is in operation, the flames of the burner are anchored onto the convex side of the burner deck. More preferably, the full surface of the burner deck is provided in a convex shape; meant is that when the burner is in operation, the full surface of the burner deck at the side of which the flames are anchored has a convex shape.

In a preferred embodiment, the circumference of the burner deck has the shape of a rectangle of which the two short sides have been rounded. More preferably, the short sides of the rectangle are continuously rounded. In embodiments in which the circumference of the burner deck has the shape of a rectangle of which the two short sides have been—preferably continuously—rounded, preferably tabs are only provided along the two long sides of the rectangular shape of the circumference of the burner deck. Meant is that no tabs are provided along the—possibly continuously—rounded short sides. Burners according to this embodiment are even better suited for long lifetime use, as the absence of tabs along the short sides allows better thermal expansion of the woven wire mesh in its length direction. Furthermore, such burner can be more easily manufactured.

Preferably, the burner comprises a perforated plate segment, provided for flow of premix gas through the perforations of the perforated plate segment before the premix gas flows through the woven wire mesh. More preferably, the perforated plate segment is an integral part of the metal plate structure. Even more preferably, the perforated plate segment and the metal plate structure are one single metal plate. The perforated plate segment is provided to distribute the premix gas to the woven wire mesh burner deck appropriately.

In embodiments wherein the burner comprises a perforated plate segment, provided for flow of premix gas through the perforations of the perforated plate segment before the premix gas flows through the woven wire mesh, all zones of the perforated plate segment provided with perforations are provided at a distance from the woven wire mesh. It is meant that no perforation makes contact with the woven wire mesh, but that the perforation is positioned at a distance from the woven wire mesh.

The second aspect of the invention is a condensing boiler comprising a premix gas burner as in any embodiment of the first aspect of the invention. Preferably, the condensing boiler comprises a cast aluminium heat exchanger.

BRIEF DESCRIPTION OF FIGURES IN THE DRAWINGS

MODE(S) FOR CARRYING OUT THE INVENTION

Figure 1:
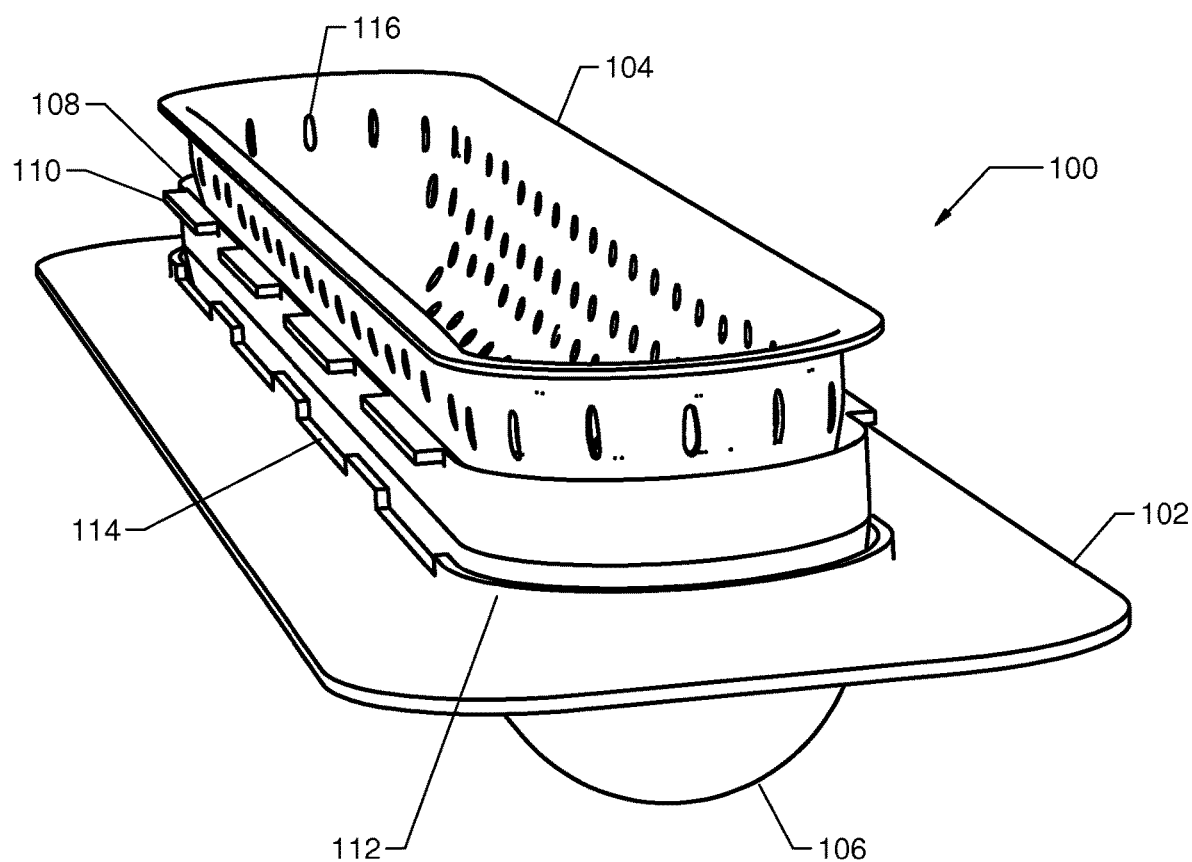
FIG. 1 shows a premix gas burner according to the invention.

FIG. 1 shows an exploded view of an example of a premix gas burner 100 according to the invention. The premix gas burner 100 comprises a metal mounting plate 102 for mounting the premix gas burner in a heating appliance; a metal plate structure 104 and a burner deck 106. The full surface of the burner deck has a convex shape. The burner deck consists out of a woven wire mesh on the outer surface of which premix gas is combusted after the premix gas has flown through the woven wire mesh. The woven wire mesh e.g. is 0.9 mm thick. The woven wire mesh comprises a circumferential edge 108. The circumferential edge comprises a plurality of tabs 110. The tabs are an integral part of the woven wire mesh. In the burner, the tabs are parallel with the mounting plate.

The mounting plate comprises a central opening. The burner deck is inserted through the central opening. The central opening is also provided for the supply of premix gas to the burner when the burner is in operation. The metal mounting plate 102 comprises a ridge 112. The ridge surrounds the complete burner deck. The ridge comprises a number of notches 114.

In the burner, each of the tabs 110 is positioned in a notch 114. In the burner, the metal mounting plate 102 and the metal plate structure 104 are in contact with each other at the top of the ridge, such that the open side of the at least one notch is covered; and such that the tabs are held in between the metal mounting plate and the metal plate structure with play being present of the tabs relative to the metal mounting plate and relative to the metal plate structure. In the burner, the metal plate structure can be e.g. be welded to the metal mounting plate at their contacting points. In the exemplary burner, the play—which is the difference between the metal mounting plate and the metal plate structure from which the thickness of the woven wire mesh is subtracted—is 0.6 mm.

The metal plate structure 104 comprises a plurality of perforations 116, provided for flow of premix gas through the perforations 116 before the premix gas flows through the woven wire mesh.

The circumference of the burner deck has the shape of a rectangle of which the two short sides have been continuously rounded. Tabs are only provided along the two long sides of the rectangular shape of the circumference of the burner deck. No tabs are provided along the continuously rounded short sides.

Figure 2:
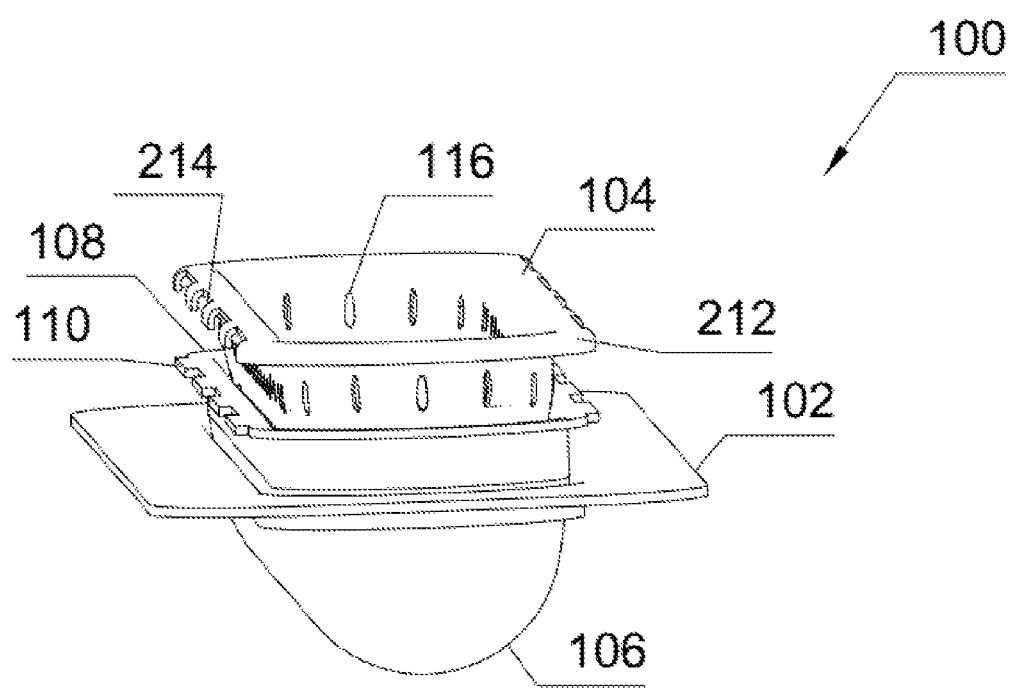
FIG. 2 shows an alternative embodiment of a premix gas burner according to the invention.

As an alternative to providing the ridge (and the notches in the ridge) in the metal mounting plate, the ridges 212 (and the notches 214 in the ridge 212) can be provided in the metal plate structure. This is shown in FIG. 2. The remainder of the burner can be the same as in the example of FIG. 1.

The invention claimed is:

1. A premix gas burner comprising
   a metal mounting plate for mounting the premix gas burner in a heating appliance,
   a metal plate structure, and
   a burner deck,
   wherein the burner deck comprises a woven wire mesh on the outer surface of which premix gas is combusted after the premix gas has flown through the woven wire mesh,
   wherein the woven wire mesh comprises a circumferential edge,
   wherein the circumferential edge comprises a plurality of tabs,
   wherein the mounting plate comprises a central opening,
   wherein the burner deck is inserted through the central opening,
   wherein the metal mounting plate or the metal plate structure comprises at least one ridge,
   wherein the at least one ridge comprises at least one notch including an open side,
   wherein each of the tabs is positioned in a notch,
   wherein the metal mounting plate and the metal plate structure are in contact with each other at the top of the ridge, such that the open side of the at least one notch is covered, and
   such that the tabs are held in between the metal mounting plate and the metal plate structure with play being present of the tabs relative to the metal mounting plate and relative to the metal plate structure.

2. The premix gas burner according to claim 1, wherein the play being present of the tabs relative to the metal mounting plate and relative to the metal plate structure is at least 0.4 mm.

3. The premix gas burner according to claim 1,
   wherein the at least one ridge is provided in the metal mounting plate,
   wherein the at least one ridge is provided at least partly around the central opening,
   wherein the at least one ridge extends towards a first side relative to the plane of the metal mounting plate,
   wherein the burner deck extends towards the other side of the plane of the metal mounting plate compared to the first side, and
   wherein the metal plate structure covers the open side of the at least one notch such that the tabs are held in between the metal mounting plate and the metal plate structure with play being present of the tabs relative to the metal mounting plate and relative to the metal plate structure.

4. The premix gas burner according to claim 1;
wherein the at least one ridge is provided in the metal plate structure,
wherein the at least one ridge extends towards a first side relative to the plane of the metal plate structure where the at least one ridge is provided,
wherein the burner deck extends through the central opening to the first side relative to the plane of the metal plate structure where the at least one ridge is provided, and
wherein the metal mounting plate covers the open side of the at least one notch such that the tabs are held in between the metal mounting plate and the metal plate structure with play being present of the tabs relative to the metal mounting plate and relative to the metal plate structure.

5. The premix gas burner according to claim 1, wherein the tabs are parallel with the plane of the metal mounting plate.

6. The premix gas burner as according to claim 1, wherein the ridge completely surrounds the burner deck.

7. The premix gas burner according to claim 1, wherein the burner deck is provided in a convex shape.

8. The premix gas burner according to claim 1, wherein the circumference of the burner deck has two linear long sides and two continuously rounded short sides.

9. The premix gas burner according to claim 8, wherein tabs are only provided along the two long sides of the rectangular shape of the circumference of the burner deck.

10. The premix gas burner according to claim 1, wherein the burner comprises a perforated plate segment, and wherein the perforated plate segment is provided for flow of premix gas through the perforations of the perforated plate segment before the premix gas flows through the woven wire mesh.

11. The premix gas burner according to claim 10, wherein the perforated plate segment is an integral part of the metal plate structure.

12. The premix gas burner according to claim 10, wherein the perforated plate segment and the metal plate structure are one single metal plate.

13. The premix gas burner according to claim 10, wherein all zones of the perforated plate segment provided with perforations are provided at a distance from the woven wire mesh.

14. A condensing boiler comprising the premix gas burner according to claim 1.

15. The premix gas burner according to claim 1, wherein the burner deck consists of the woven wire mesh on the outer surface of which premix gas is combusted after the premix gas has flown through the woven wire mesh.

* * * * *